Feb. 6, 1934.  W. P. HILGER  1,945,742
FROST SHIELD
Filed Oct. 28, 1931
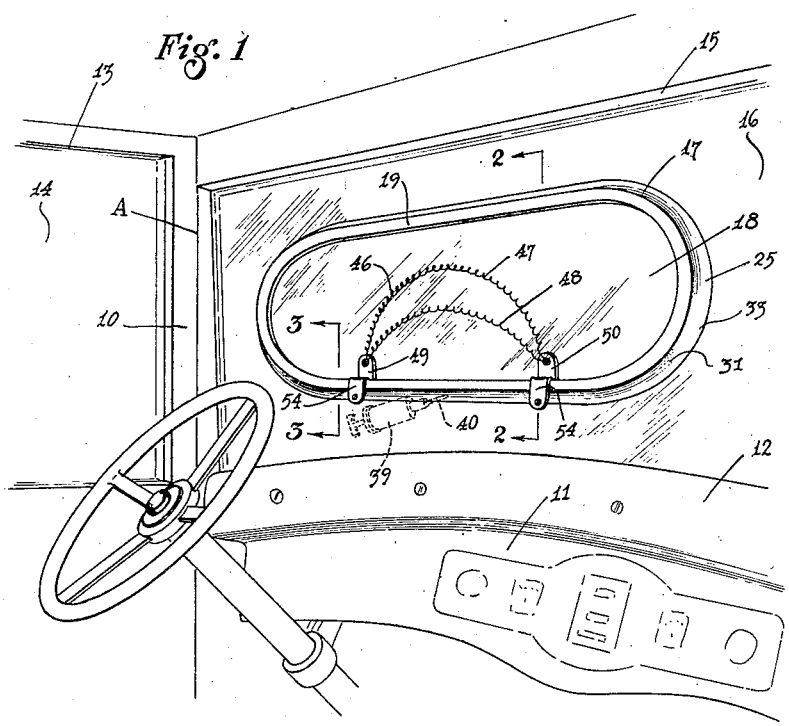
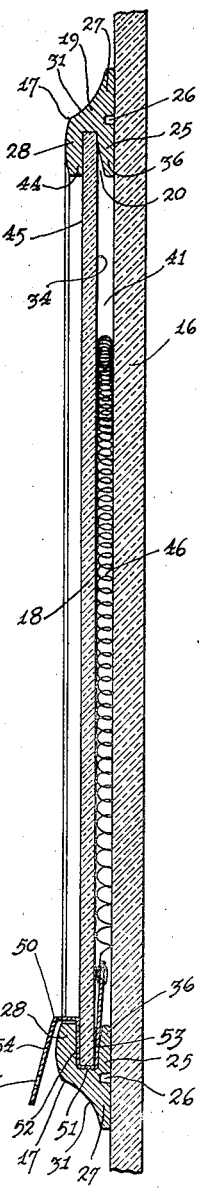
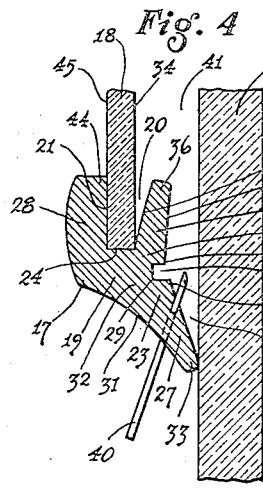
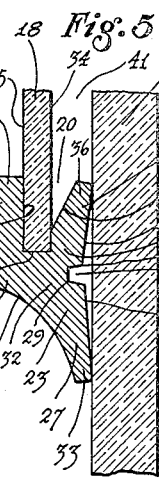
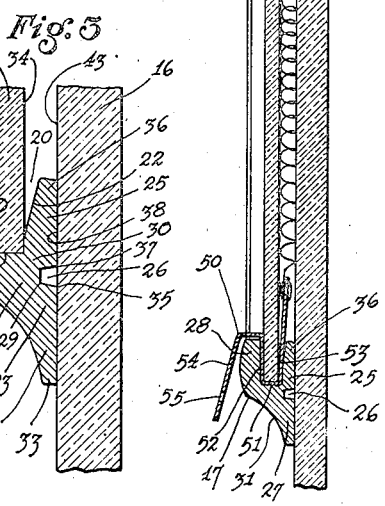
Inventor
William Peter Hilger
By Caswell & Lagaard
Attorneys Patented Feb. 6, 1934

1,945,742

UNITED STATES PATENT OFFICE 1,945,742

FROST SHIELD

William Peter Hilger, St. Cloud, Minn.

Application October 28, 1931. Serial No. 571,561

14 Claims. (Cl. 20—40.5)

My invention relates to frost shields and has for its object to provide a frost shield which may be readily applied to or removed from the surface on which the shield is to be attached and which when applied will remain rigidly secured thereto until removal is desired.

Another object of the invention resides in providing a frost shield including a frame adapted to be secured to the shield through suction.

An object of the invention resides in providing the frame with a base having a vacuum space therein coextensive with the length thereof.

Another object of the invention resides in constructing the frame with a groove in the body thereof for the reception of a pane of glass and another groove in the base thereof dividing said base into inner and outer flaps for engagement with the surface on which the frost shield is applied.

A still further object of the invention resides in disposing said grooves so that the bottom of one groove lies in close proximity to the bottom of the other groove forming a weakening in the frame serving as a hinge for the inner flap of the frame.

Another object of the invention resides in covering the body of the frame in proximity to said second named groove to form a weakening in the frame serving as a hinge for the outer flap.

An object of the invention resides in constructing said flaps so that the free edges thereof extend outwardly from the surface of the pane of glass a distance greater than the inner portions of said flaps whereby said flaps are spread outwardly as the frame is forced against the surface on which the shield is to be applied.

Another object of the invention resides in constructing the flaps so that the free edge of the outer flap engages the surface prior to that of the inner flap as the frame is forced against the surface on which it is to be applied.

A still further object of the invention resides in constructing the frame with a member overlying the outer surface of the pane of glass and forming one side of said first named groove and in further constructing said outer flap in a manner such that flexure of said flap will be transmitted to said member and will cause the free edge thereof to move toward the glass and effect a seal therebetween.

Another object of the invention resides in providing a frost shield in which the vacuum space within the frame is evacuated to a higher degree than the space within the frost shield proper.

An object of the invention resides in the method of applying the frame to the surface on which the same is to be attached which consists in first evacuating the space within the frost shield and within the base thereof and in thereafter further evacuating the space within the base of the frame to a higher degree of vacuum than that within the shield proper.

Another object of the invention resides in the method of evacuation which consists in first simultaneously evacuating both chambers and in thereafter closing communication between the two chambers and continuing the evacuation in the chamber within the frame until the desired degree of evacuation has been obtained therein.

A still further object of the invention resides in the method of evacuation which consists in inserting a needle through the outer flap, which needle projects into said vacuum space and by means of which the air may be exhausted therefrom and from the space within the frost shield, said flap serving to seal the opening through which said needle is inserted when the needle is removed therefrom.

Another object of the invention resides in the construction of the frame whereby the inner flap is caused to form the seal between the two vacuum chambers when the desired degree of vacuum has been obtained within the chamber within the frost shield.

A still further object of the invention resides in providing a heating element within the space between the pane of glass and the surface on which it is to be applied and in providing a ribbon forming a connecter for said element adapted to follow about the edge of the glass and lying along the groove within said frame member, said element being imbedded within said frame member whereby leakage between the space within the frost shield and the exterior is prevented.

Other objects of the invention reside in the novel combination and arrangement of parts and in the details of construction hereinafter illustrated and/or described.

In the drawing:

Fig. 1 is a perspective view of the interior portion of a motor vehicle illustrating an embodiment of my invention applied to the wind shield thereof.

Fig. 2 is an elevational sectional view taken on line 2—2 of Fig. 1 and drawn to a larger scale.

Fig. 3 is an enlarged detail sectional view taken on line 3—3 of Fig. 1.

Figs. 4 and 5 are views similar to Fig. 3 showing the method of applying the frame to the wind shield.

For the purpose of illustrating the application of my invention I have shown a portion of the interior of a motor vehicle which is indicated in its entirety at A. The part of the motor vehicle shown includes the body frame structure 10 with a dashboard 11 and a cowl 12 applied thereto. In the frame 10 is mounted a door 13 carrying the usual window 14. A wind shield frame 15 is also supported in the frame 10 which carries a wind shield 16 of ordinary construction. In installing my invention, the same is preferably applied to the inner surface 43 of the wind shield 16. The invention may be applied to any type of window, wind shield or other surface on which protection from frost is desired, and inasmuch as the particular construction of the portions of the vehicle shown do not form any particular feature of the invention, the same have not been illustrated or described in detail.

My invention proper comprises a frame 17 constructed of rubber or some other suitable flexible material which supports a pane of glass 18 and which may be attached to the wind shield 16 or to the windows 14 of the vehicle as desired. The pane of glass 18 is preferably constructed without sharp corners so that the frame 17, which is of uniform size throughout its length, may be readily applied to the glass and effect an air tight seal for the dead air space provided between the glass 18 and the surface of the wind shield 16.

The frame 17 comprises a body portion 19 which is constructed with a groove 20 along the inner portion thereof and in a plane parallel with and spaced from the surface of the wind shield 16. This groove is formed with one surface 21 parallel to the wind shield 16 and with another surface 22 converging toward said wind shield. The groove 20 is for the reception of the pane of glass 18 and is constructed at the bottom 24 thereof of a width slightly less than the thickness of the pane of glass so as to snugly receive the same.

The body 19 is further formed with a base which I have indicated in its entirety at 23, which base is constructed with a concave surface 38 adapted to contact with the window or wind shield. The base 23 has a vacuum groove 26 extending inwardly into the same and away from the surface 38 thereof which divides the base in two parts constituting an inner flap 25 and an outer flap 27. The flap 25 lies along the surface 22 of groove 20 while a member 28 lies along the surface 21 of said groove and overlies the glass 18 upon the exterior marginal portion of the same.

The groove 26 is so disposed that the bottom 29 thereof lies in close proximity to the bottom 24 of groove 20 forming a weakening in the body 19 at the root of the flap 25 which I have indicated at 30 in the drawing. This weakening constitutes a hinge whereby the flap 25 may readily move from one to the other of the various positions shown in Figs. 3, 4 and 5. The outer surface of the body 19 is coved as illustrated at 31 to form a further weakening 32 at the bottom of the groove 26 which in a similar manner forms a hinge permitting the said flap to swing and assume the various positions shown in Figs. 3, 4 and 5. In the construction of the base 23, the flap 27 is so formed that its free edge 33 projects outwardly from the inner surface 34 of the glass 18 a distance greater than the inner edge 35 thereof adjoining groove 26. Likewise the free edge 36 of flap 25 projects outwardly from the surface 34 of the pane of glass 18 a distance greater than the inner edge 37 thereof adjacent the groove 26. When the frame is applied to the wind shield, a space 41 is formed between the glass 18 and the wind shield 16, and another space formed between the edges 33 and 36 of flaps 27 and 25 and between the surface 38 of base 23 and the wind shield 16. The particular use of this construction will be presently explained in detail.

The method of attaching the frost shield to a surface such as the surface 43 of the wind shield 16 is as follows: The frame 17 is first applied to the glass 18, which is readily accomplished due to the fact that the said frame is highly elastic and resilient. The contacting surface 38 of base 23 is next coated with some suitable adhesive or other suitable plastic substance which will readily maintain a vacuum within the frame proper and hold the frost shield attached to the window or wind shield of the motor vehicle. The frost shield is then applied to the surface 43 of the wind shield in the proper position and the same pressed slightly against the shield until the edge 33 of flap 27 engages the surface of the wind shield throughout the entire extent of said flap. A vacuum pump such as illustrated at 39 in Fig. 1 and having a needle 40 connected therewith is employed for evacuating the space 41 between the glass 18 and the wind shield 16 and the vacuum space 42 within the base 23. The needle 40 of this pump, which is preferably sharpened, is inserted through the flap 27 so that the point thereof projects through said flap at a locality between the edges 33 and 35 thereof. The said needle is also inserted in a slanting manner through said flap so that the aperture formed thereby is readily closed when the needle is removed. After the frost shield has been applied, pump 39 is manipulated and a partial vacuum created within both the space 41 and the space 42. As the vacuum in the spaces increases, the glass 18 moves toward the surface 43 of the wind shield 16 due to atmospheric pressure upon the exterior thereof until finally the edge 36 of flap 25 comes into engagement with said surface as shown in Fig. 5. The resiliency of the rubber and the degree of weakenign of both the flaps 27 and 25 at 32 and 30 is such that the edge 36 of flap 25 comes in contact with the surface 43 of the wind shield when the desired degree of vacuum has been procured in the space 41. As the evacuation of the vacuum space 42 continues, a higher degree of evacuation is obtained therein until finally the surface 38 of base 23 is drawn tight against the surface 43 of wind shield 16. The needle 40 is then removed and the opening through the flap 27 closed through the agency of said flap thereby maintaining the vacuum within the groove 26 and the space 41. The evacuation of space 41 reduces the moisture contained within the air therein. At the same time, the vacuum within the space 41 assists in holding the frame properly applied to the wind shield while the adhesive is setting.

In the movement of the base 23 from the position shown in Fig. 5 to that shown in Fig. 3, an appreciable lateral movement of the edges 33 and 36 of flaps 27 and 25 occurs in the event the said flaps are free to move. This has the effect of advancing the edges of the base beyond the edges of the adhesive band formed on the wind shield upon the initial application of the frost shield thereto, thereby preventing the showing of any adhesive after the frost shield has been ultimately affixed. In the event that the adhesive is so tacky as to substantially resist the outward movement of said edges upon the surface 43 of the wind shield, the portions 32 and 30 of said frame, which as previously described are weakened to form hinges for the swinging of said flaps, will be compressed and the flaps 25 and 27 will thereupon be brought into full contact with the surface of the wind shield.

In the removal of the frost shield from the window or other surface upon which it is applied, a knife or other sharp instrument may be inserted beneath the flap 27 and the same freed from the surface 43 of the wind shield up to the groove 26. One's fingers may then readily be inserted between the member 28 and the glass 18, to disengage the same from contact with the glass 18. Both the flap 27 and member 28 may then be grasped and tension applied to the flap 25 which serves to withdraw the same from in between the glass 18 and wind shield 16. As soon as this flap has been loosened, the entire frame may be easily withdrawn from engagement with the glass 18 and wind shield 16 whereby the entire frost shield is easily and readily removed without danger of breaking the glass 18.

In the construction of flap 27 and the portion 28 of body 19 of frame 17, the flap 27 is formed substantially continuous with member 28 so that flexure applied to said flap will be transmitted to the member 28. As the flap 27 is moved into position to engage the surface 43 of the wind shield, the free edge 44 of member 28 is forced into engagement with the outer surface 45 of the glass 18. This causes the glass to be pinched tightly by the member 28 which provides a seal for maintaining the vacuum within the space 41 and for holding the glass rigidly immovable within the supporting frame therefor.

For the purpose of maintaining the space 41 between the frost shield and the wind shield properly heated, an electric heating element 46 is employed which may consist of two resistances 47 and 48 connected in parallel to two terminals 49 and 50. The terminals 49 and 50 are identical in construction, the terminal 50 being illustrated in detail in Fig. 2. This terminal is formed from a ribbon of metal relatively thin in thickness, which is bent to fit about the edge of the glass 18 as indicated at 51. The bent portion 51 of said terminal is lodged within the groove 20, the reaches 52 and 53 of said terminal being imbedded in the surfaces 21 and 22 of member 28 and the flap 25. By means of this construction, an air tight seal is formed between said terminal and the frame structure of the frost shield whereby electric current may be delivered to the heating element 46 without drilling of the glass or reducing the vacuum within the frost shield. The protruding ends 54 of the terminals 49 and 50 are formed with openings 55 in which suitable binding posts may be attached whereby the said terminals may be connected to the battery of the motor vehicle.

The advantages of my invention are manifest. By utilizing a vacuum within the frost shield proper the frame is maintained attached to the window or wind shield while the adhesive applied is given an opportunity to set. At the same time, the moisture content within the frost shield is greatly reduced so that frosting is entirely prevented. By the use of a glass pane instead of celluloid, much greater visibility is procured. By the construction of the flaps as brought out, a lesser vacuum is produced within the wind shield proper than within the vacuum groove within the base of the frame. This prevents breaking of the glass due to excessive vacuum and permits of as high a vacuum within the frame as desired. When once the frost shield has been applied, the same remains securely attached to the wind shield or window as long as desired. The member of the frame overlying the pane of glass is connected to the outer flap in such a manner as to be moved toward the pane of glass when the frost shield is being applied to the wind shield to cause the glass to be pinched thereby and to form an air tight seal between said glass and the frame. In the event that excess adhesive is employed in the attachment of the frame to the wind shield, the excess is accommodated in the vacuum groove. By the application of the pump needle into the vacuum space through the outer flap, the opening formed thereby is sealed so that the vacuum within the base is retained. The particular terminals used for connecting the heater to the battery of the motor vehicle, being imbedded in the body of the frame, leave no openings between the frame and glass so that the vacuum within the frost shield proper is maintained in exactly the same manner as if the terminals were absent.

Changes in the specific form of my invention as herein disclosed may be made within the scope of what is claimed, without departing from the spirit of my invention.

Having described my invention, what I claim as new and desire to protect by Letters Patent is:

1. A frost shield comprising a frame formed of flexible material, said frame consisting of a body having a groove therein for the reception of a pane of glass and a base coextensive with the length of the frame for engagement with the surface on which the frame is to be applied, said base having a groove in it coextensive with the length of the frame, said groove being disposed medially of the edges of said base to form inner and outer flaps adapted to engage the surface on which the frame is applied, said flaps being formed so that their free edges are adapted to engage the surface on which the frame is applied in advance of the portion of the surface thereof adjoining said groove, as the body of the frame is brought into position upon said surface, said outer flap normally extending further from the surface of the pane of glass so as to first contact with the surface on which the frame is applied as the frame is brought into position.

2. A frost shield comprising a frame formed of flexible material, said frame consisting of a body having a groove therein for the reception of a pane of glass and a base coextensive with the length of the frame for engagement with the surface on which the frame is to be applied, said base being weakened medially of the inner and outer edges thereof and throughout the length thereof to provide inner and outer flaps independently movable toward and from the surface on which the frame is to be applied, the outer flap having its free edge normally disposed a greater distance from the plane of the pane of glass than the free edge of the inner flap.

3. A frost shield comprising a frame formed of flexible material, said frame consisting of a body having a groove therein for the reception of a pane of glass and a base coextensive with the length of the frame for engagement with the surface on which the frame is to be applied, said base having a groove in it coextensive with the length of the frame, said groove being disposed in proximity to the first named groove to form in said body a flap adapted to engage the surface on which the frame is applied and constituting a wall for said first named groove.

4. A frost shield comprising a frame formed of flexible material, said frame consisting of a body having a groove therein for the reception of a pane of glass and a base coextensive with the length of the frame for engagement with the surface on which the frame is to be applied, said base having a groove in it coextensive with the length of the frame, said groove being disposed with the bottom thereof in proximity thereof to the bottom of said first named groove to form a weakening in said body and to leave a flap constituting a wall of said second named groove and hinged on said body through the weakened portion thereof.

5. A frost shield comprising a frame formed of flexible material, said frame consisting of a body having a groove therein for the reception of a pane of glass and a base coextensive with the length of the frame for engagement with the surface on which the frame is to be applied, said base having a groove in it coextensive with the length of the frame, the outer surface of said body being coved to form a weakening in said body in proximity to the bottom of said groove and to form a flap hinged to said body through the weakened portion thereof.

6. A frost shield comprising a frame formed of flexible material, said frame consisting of a body having a groove therein for the reception of a pane of glass and a base coextensive with the length of the frame for engagement with the surface on which the frame is to be applied, said base having a groove in it coextensive with the length of the frame, said groove being disposed with the bottom thereof in proximity to the bottom of said first named groove to form a weakening in said body and to leave a flap constituting a wall of said second named groove and hinged on said body through the weakened portion thereof, said body being further coved to provide a second weakening in proximity to said groove and to form a second flap hinged to said body through the second weakened portion thereof.

7. A frost shield comprising a frame formed of flexible material, said frame consisting of a body having a groove therein for the reception of a pane of glass and a base coextensive with the length of the frame for engagement with the surface on which the frame is to be applied, said body having a member lying upon the outer portion of the pane of glass, said base having a flap whose surface normally extends away from the surface on which the frame is to be applied, said flap being connected with said member and being adapted to exert a twisting effect upon said member when the frame is brought into position upon the surface on which it is to be attached causing a pressure to be applied to the pane of glass through the free edge of said member whereby a pressure maintained seal is effected between the glass and frame.

8. A frost shield comprising a frame formed of flexible material, said frame consisting of a body having a groove therein for the reception of a pane of glass and a base coextensive with the length of the frame for engagement with the surface on which the frame is to be applied, said body having a member lying upon the outer portion of the pane of glass, said base having a flap whose surface normally extends away from the surface on which the frame is to be applied, said flap being connected with said member and being adapted to exert a twisting effect upon said member when the frame is brought into position upon the surface on which it rests causing a pressure to be applied to the pane of glass through the free edge of said member whereby a pressure maintained seal is effected between the glass and frame, said base being formed with another flap constituting a wall of said groove, said second named flap exerting pressure upon the pane of glass at the outer edge of the pane of glass.

9. A frost shield comprising a frame formed of flexible material, said frame consisting of a body having a groove therein for the reception of a pane of glass and a base coextensive with the length of the frame for engagement with the surface on which the frame is to be applied, said base being formed with two flaps, one of which constitutes a wall forming said groove, said groove diverging along the surface thereof formed on said wall from the bottom thereof and along the surface of the wall formed by said flap, said flap being adapted to first engage the surface on which the frame is mounted through the free edge thereof and to subsequently engage the surface inwardly of the free edge thereof as the frame is applied to the surface, the movement of said flap from its former to its latter position changing the degree of diversion of said groove.

10. A frost shield comprising a frame formed of flexible material, said frame consisting of a body having a groove therein for the reception of a pane of glass and a base coextensive with the length of the frame for engagement with the surface on which the frame is to be applied, said base having inner and outer flaps with the free edges thereof extending outwardly from the surface on said pane of glass different distances, the outer flap being adapted to first engage the surface on which the frame is applied and the inner flap being adapted to subsequently engage the surface on which the frame is applied as the frame is being moved into position thereon.

11. The method of mounting frost shields formed with frame having a vacuum space, which consists in applying adhesive to the frame along such portions thereof as form said vacuum space, in first evacuating the space within said frost shield and said vacuum space, in thereafter terminating the evacuation of said space within the frost shield and further reducing the vacuum within said vacuum space to a higher degree of vacuum and in maintaining a partial vacuum within said frost shield during the initial setting of said adhesive.

12. A frost shield comprising a frame formed of flexible material, said frame consisting of a body having a groove therein for the reception of a pane of glass and a base coextensive with the length of the frame for engagement with the surface on which the frame is to be applied, said base having a vacuum space therein normally in communication with the space within said frost shield and a wall on said body adapted to collapse on partial evacuation of the space within said frost shield and said vacuum space to close communication between said spaces to maintain a partial degree of exacuation within said frost shield upon further exhaustion of the vacuum space within said frame.

13. A frost shield comprising a frame formed of flexible material, said frame consisting of a body having a groove therein for the reception of a pane of glass, and a base coextensive with the length of the frame for engagement with the surface on which the frame is to be applied, said base having two flaps arched with respect to one another to form a concavity within the base serving to produce a suction between the body and the member on which the frame is applied, said body having a groove therein intermediate said flaps and disposed in proximity to said first named groove and to the outer surface of one of said flaps to form a weakening at the junctures of said flaps with said body whereby the flaps may hinge along said weakenings upon application of pressure to the frame to cause the frame to adhere to the surface on which it is applied.

14. A frost shield comprising a frame formed of flexible material, said frame consisting of a body having a groove therein for the reception of a pane of glass, and a base coextensive with the length of the frame for engagement with the surface on which the frame is to be applied, said base having a flap extending outwardly beyond the edge of the glass, said flap being reduced in thickness outwardly from the edge of the glass to cause the same to flex in the application of the frame to the glass.

WILLIAM PETER HILGER.